(12) United States Patent
Roy et al.

(10) Patent No.: US 11,494,308 B2
(45) Date of Patent: Nov. 8, 2022

(54) METHODS AND DEVICES FOR BYPASSING THE INTERNAL CACHE OF AN ADVANCED DRAM MEMORY CONTROLLER

(71) Applicant: UPMEM, Grenoble (FR)

(72) Inventors: Jean-François Roy, Grenoble (FR); Fabrice Devaux, Lausanne (CH)

(73) Assignee: UPMEM, Grenoble (FR)

( * ) Notice: Subject to any disclaimer, the term of this patent is extended or adjusted under 35 U.S.C. 154(b) by 575 days.

(21) Appl. No.: 16/331,429

(22) PCT Filed: Sep. 6, 2017

(86) PCT No.: PCT/FR2017/052368
§ 371 (c)(1),
(2) Date: Oct. 13, 2020

(87) PCT Pub. No.: WO2018/046850
PCT Pub. Date: Mar. 15, 2018

(65) Prior Publication Data
US 2021/0349826 A1    Nov. 11, 2021

(30) Foreign Application Priority Data
Sep. 8, 2016  (FR) .................................. 1658373

(51) Int. Cl.
*G06F 12/0888*    (2016.01)
(52) U.S. Cl.
CPC .. *G06F 12/0888* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 5,361,391 A | 11/1994 | Westberg | |
| 5,459,856 A | 10/1995 | Inoue | |
| 6,282,604 B1 | 8/2001 | May | |
| 7,975,109 B2* | 7/2011 | McWilliams | G06F 12/0806 711/E12.066 |
| 2003/0221078 A1* | 11/2003 | Jeddeloh | G06F 13/1689 711/167 |
| 2010/0205350 A1* | 8/2010 | Bryant-Rich | G06F 12/06 711/115 |
| 2018/0039586 A1 | 2/2018 | Devaux et al. | |

FOREIGN PATENT DOCUMENTS

| | | |
|---|---|---|
| EP | 0886216 A1 | 12/1998 |
| FR | 3032814 A1 | 8/2016 |
| WO | 0055734 A1 | 9/2000 |

* cited by examiner

*Primary Examiner* — Charles J Choi
(74) *Attorney, Agent, or Firm* — Phillips Winchester

(57) ABSTRACT

A calculation system comprises a computing device having one or more instruction-controlled processing cores and a memory controller, the memory controller including a cache memory; and a memory circuit coupled to the memory controller via a data bus and an address bus, the memory circuit being adapted to have a first m-bit memory location accessible by a plurality of first addresses provided on the address bus, the calculation device being configured to select, in order to each memory operation accessing the first m-bit memory location, one address among the plurality first addresses.

17 Claims, 2 Drawing Sheets

METHODS AND DEVICES FOR BYPASSING THE INTERNAL CACHE OF AN ADVANCED DRAM MEMORY CONTROLLER

CROSS-REFERENCE TO RELATED APPLICATIONS

This patent application is a 371 of International Application No. PCT/FR2017/052368, filed Sep. 6, 2017, which claims the priority of the French patent application FR16/58373, filed Sep. 8, 2016, which will be considered as an integral part of this description.

BACKGROUND

This application concerns a calculation system including a processor, memory, and a control interface between the processor and the memory.

A PIM processor (Processor In Memory) is a processor directly integrated into a memory circuit, for example in a DRAM memory circuit. In this document, this memory circuit is called a PIM circuit.

A PIM processor is controlled by a main processor, typically an Intel, ARM or Power processor. In this document, this processor is called HCPU (Host CPU).

The PIM processor and the HCPU have access to the memory in which the PIM processor is integrated. In this document, this memory is called PIM memory.

The published patent application under the number FR 3032814 describes for example a way to allow PIM and HCPU processors to access the PIM memory.

Each PIM processor has registers that allow the HCPU to control it. These registers accessible by the HCPU, are visible in the physical addressing space of the PIM circuit. In this document, these registers are called interface registers, all the interface registers of a PIM processor being called the interface of this PIM processor, and the software, running on the HCPU, controlling this interface being called the interface software.

Characterization of Communications

The HCPU typically performs the following actions in order to use a PIM processor:
  a lot of entries for parameter, instructions and data, in the PIM memory;
  relatively few entries for parameters, instructions, data and commands, in some of the interface registers of this PIM processor;
  relatively few readings of status and results from the interface registers of the PIM processor;
  many readings of results from the PIM memory.

Problem with Delayed Entries

The entries generated by the HCPU having as destination either the interface of a PIM processor, either the PIM memory, must be processed without delay.

An HCPU has a cache system and this may delay an entry in the PIM circuit for an undetermined time.

The HCPU processors have instructions for cache management to force the updating in the main memory of a data specified by its address, which has only been written in the cache of the processor.

Unfortunately, these cache management instructions do not affect the cache of the DRAM controller if has one, which is the case of high-performance processors such as HCPUs.

In addition, these update instructions ensure that written data is "pushed" to the DRAM controller, but not that it is "pushed" to the memory circuit.

When a system has normal memory, without an integrated PIM processor, the software does not need to use a cache management instruction after an entry, because it does not matter whether the entry reaches the memory circuit quickly.

The cache affected by the cache management instructions is named in this document "CPU cache", the cache not affected by these instructions being named "DRAM cache".

Problem with Delayed Entries in Non-Volatile Memories

Delayed entries are also a problem for non-volatile memories that do not have a PIM processor.

For example, some MRAM memories (magnetic memory), such as the one manufactured by the EVERSPIN company, are designed to present a DRAM-compatible interface, allowing their use with a DRAM controller.

Before being able to shut off the electric supply of a computer system using such memories, it is important to be able to be sure than there is no more entries targeting the MRAM that are on standby in the cache DRAM, otherwise these records would be lost if the supply of electricity is discontinued.

Problem with Merged Entries

Another problem is that if a C1 data to be written to a certain address is stored in the DRAM cache, this data can be replaced by the arrival of a new C2 data for the same address, the DRAM cache considering it optimal not to write C1 in the memory circuit, C1 being supplanted by C2.

If this reasoning is right for a memory, it is not for an interface register receiving the commands of the HCPU: if C1 and C2 are two distinct commands, it is necessary that C1 and then C2 be written in the PIM circuit.

Problem of Reordered Entries

Another problem is that the DRAM cache can change the order in which the entries of data are performed, which is problematic even when these entries have different addresses.

Thus a sequence composed of:
  the entry of a command parameter in an interface register called PARAM,
  then the entry the corresponding command into another interface register called CMD;
can be performed in the opposite direction by the DRAM cache, so that the command written in CMD will be executed using as parameter the old value of the PARAM register, which has not yet been written by the new parameter.

Problem of Obsolete Hidden Values

When the HCPU reads a V2 value at an AV address, this V2 value having been generated by a PIM processor, it is important that the value read by the HCPU is this recent V2 value, and not a previous V1 value that was copied into a cache during a reading prior to the generation of V2, at this same AV address.

HCPU processors have cache management instructions, allowing a data specified by its address in the cache to be invalidated.

Also, after executing such an instruction with the AV address as parameter, the value V1 is no longer present in the cache, and if the HCPU reads back a data to the AV address, it will obtain the V2 value from the memory circuit and the cache will then hide that value V2.

Unfortunately, those cache management instructions do not affect the DRAM cache.

An invalidation instruction targeting the AV address guarantees that the V1 value is no longer present in it CPU cache, but does not guarantee that the V1 value is not still present in the DRAM cache.

If such is the case, when the HCPU will reread the AV address, as this address is no longer in the CPU cache, it will request a reading at the AV address from the DRAM controller. But the latter has an entry from its DRAM cache that:
  is valid,
  corresponds to the AV address,
  still contains the old V1 value.

So, instead of reading the V2 value from the PIM circuit, the DRAM controller will just return the V1 value from its DRAM cache.

When a system has normal memory, without an integrated PIM processor, the software does not need to use a cache management instruction before reading data: a data in the CPU cache is always the most recent because only the HCPU modifies the memory, whereas in a system with a PIM processor, the latter can also modify the memory.

Modification of HCPUs

The most logical solution would be for HCPUs be modified in order that cache management instructions affect also the DRAM caches.

Unfortunately, it is very difficult to convince a manufacturer of HCPUs to make such a change, because:
  the design cost of an HCPU is very high and such a design takes several years,
  the delay in the design of the HCPU due to this modification would have a very high cost for the manufacturer,
  The PIM processor support via such a modification may go against the industrial and marketing strategy of the manufacturer.

Consequently, there is a need for a solution to the communication problems between an HCPU and a PIM processor integrated in a DRAM, which does not require HCPUs to be modified, but that is entirely implemented
  in the interface of the PIM processor, and
  by the interface software.

SUMMARY

An exemplary embodiment provides a calculation system including a: a calculation device having one or several instruction-controlled processing cores and a memory controller, the memory controller comprising a cache memory; and a memory circuit coupled to the memory controller via a data bus and an address bus, the memory circuit being adapted to have a first m-bit memory location accessible by a plurality of first addresses provided on the address bus, the computing device being configured to select, for each memory operation accessing the first m-bit memory location, an address from the plurality of first addresses.

According to an embodiment, the first m-bit memory location is accessible by a P plurality of first addresses, the computing device being configured to use one of the first addresses to access the first memory location during an $N^{th}$ and an $(N+P)^{th}$ operation for accessing the first memory location.

According to an embodiment, each address of the plurality of first addresses includes a first value of n bits and a second value of p bits, the calculation device being configured to carry out a data writing operation to the m bits of the first location memory by performing a reading operation of the first memory location by using one of the first addresses with a first selected n-bit value and a second p-bit value generated according to the writing data.

According to an embodiment, the memory circuit is adapted, in response to receiving a reading operation in its first memory location using one of the first addresses, to be written the second p-bit value of the address in it first memory location.

According to an embodiment, p and n are integers and n is equal to or greater than p.

According to an embodiment, the memory circuit is adapted to have a second memory location accessible through a plurality of second addresses provided on the address bus.

According to an embodiment, the first and second memory locations are part of a first memory location range of the memory circuit, the first memory location range being selected by a sliding address window, in which the memory locations of the first memory location range are addressable:
  by corresponding addresses in a first range of addresses comprising one from the first plurality of addresses and one from the second plurality of addresses; and
  by corresponding addresses in a second range of addresses including one from the first plurality of addresses and one from the second plurality of addresses;
the memory circuit including an address conversion circuit adapted to convert addresses in the first and second range of addresses to corresponding addresses in the sliding address window.

According to an embodiment, the address conversion circuit includes at least one programmable register to define the location of the sliding address window.

According to another embodiment, said at least one address conversion circuit register is programmable to define the location and size of the sliding address window.

According to another embodiment, the memory controller is adapted to perform an operation of cache evacuation, the cache evacuation operation including one or several memory access instruction sequences performed by the memory controller with the following result:
  all or part of the cache memory writing transactions stored in the cache memory of the memory controller are written in the memory circuit; or
  all or part of the reading data stored in the memory cache of the memory controller is removed from the memory cache, the reading data comprising the data read from the memory circuit the evacuation operation of the cache; or
  all or part of the cache memory reading transactions stored in the memory cache of the memory controller are written to the memory circuit and all or part of the reading data stored in the cache memory of the memory controller is cleared from the cache memory.

According to another embodiment, the memory circuit further includes an auxiliary processor, and the sequence of memory access instructions includes only register access instructions to access one or more control registers of the memory circuit to control the auxiliary processor.

According to another embodiment, the memory circuit includes a monitoring circuit, accessible by the calculation device, and adapted to record memory access transactions performed in the memory circuit, the calculation device being configured to generate said one or more memory access instruction sequences based on transactions recorded by the monitoring circuit.

According to another embodiment, the memory circuit further includes an auxiliary processor, the first and second memory locations being auxiliary processor control registers.

According to another embodiment, the calculation device is configured to generate commands of a first type and of a second type, the memory circuit being adapted to modify the order of the commands received from the calculation device in such a way that, for a first group of commands of the second type generated by the calculation device between the first and second commands of the first type, the order of the first and second commands of the first type in relation to the command group of the second type is respected.

According to another embodiment, the memory circuit is adapted to modify the order of the commands based on an order value associated with at least each command of the first type, the order value of each order being included
in the address of the recipient of the command; or
in the command itself; or
partly in the address of the command recipient and partly in the command itself.

According to another embodiment, the calculation device further includes a CPU cache memory that can be configured by cache management instructions, while the cache memory of the memory controller is not configurable by cache management instructions.

According to another embodiment, the memory circuit includes a non-volatile memory matrix.

Another embodiment provides for an access process to a memory circuit coupled with a memory controller of a calculation device via a data bus and an address bus, the calculation device having one or several processing cores and the memory controller comprising a cache memory, the process comprising selecting, by the calculation device, for each memory operation accessing a first m-bit memory location of the memory circuit, one from a plurality of first addresses, the first m-bit memory location being accessible by each of the plurality of first addresses provided on the address bus.

According to another aspect, a system composed of a main circuit and at least one memory circuit is provided; the main circuit comprising at least one main processor and a memory controller connected to the memory circuit; the memory controller comprising a cache which is not affected by the cache management instructions of the main processor; the memory circuit including at least one auxiliary processor; this auxiliary processor comprising an interface that is accessible to the main processor; this interface including registers, each interface register being accessible by the main processor through a plurality of addresses; the interface being controlled by software running on the main processor, the software choosing for each access to a given register of the interface, one address from the plurality of addresses corresponding to the given register.

According to another embodiment, the choice of the address to access a given interface register is made in such a way that an address, used during the $N^{th}$ access to this register, will be used during the $(N+P)^{th}$ access to this register, P being the number of addresses composing the plurality of addresses associated with this register.

According to another embodiment, the access address to at least one interface register is built by assembling a first n-bit field called major field, with a second p-bit field, called minor field, where the value of the major field is chosen among a plurality of values, and where the value of the minor field may have any value included between 0 and $(2^P)-1$, the reading of the interface register at the address {major field, minor field} involving its writing by the minor field value, the software using such readings to write values in the register interface.

According to another embodiment, the possible values of the minor field are restricted to values which can be written to the interface register.

The advantage of the use, during a reading operation, of an address field to transmit bits to be written into the memory is that the reading operation is not likely to be put on standby in the cache memory, as could be the case of a writing operation.

According to another embodiment, interface registers allow the position and if necessary the size to be configured, of an additional access window on an memory area of the memory circuit, this access window being accessible through a plurality of address ranges, and where the interface software provides access to the memory of the circuit memory by positioning the access window on the memory area concerned, and choses the access addresses among the plurality of address ranges allowing to access that access window.

According to another embodiment, the interface software selects the addresses to access to the access window in such a way that if the address of $N^{th}$ access to the access window is chosen from a given address range, the address of $(N+P)^{th}$ access will be selected in the same address range, P being the number of address ranges composing the plurality of address ranges.

According to another embodiment, the software controlling the interface uses an access sequence, chosen from a set of predetermined access sequences, to remove from the memory controller's cache the writing transactions issued prior to this sequence, thus forcing the effective execution of these writing transactions, the determination of predetermined access sequences being made from known characteristics or characteristics deduced from observation, from the memory controller's cache.

According to another embodiment, the software controlling the interface uses an access sequence, chosen from a set of predetermined access sequences, to remove from the controller memory cache the data read prior to this sequence, the determination of the predetermined sequences being made from characteristics either known or inferred from observation of the controller memory cache.

According to another embodiment, the software controlling the interface uses an access sequence, chosen among a set of predetermined access sequences, to remove from the controller memory cache the writing transactions and the data read prior to this sequence, the determination of predetermined sequences being based on characteristics either known or deduced from observation, of the memory controller cache.

According to another embodiment, the access sequence is reduced in such a way that it only guarantees the evacuation from the memory controller cache of the writing transactions or of read data, corresponding to a subset of the physical addresses associated with the memory circuit.

According to another embodiment, the predetermined access sequences only include access to interface registers.

According to another embodiment, the interface includes a mechanism for recording the last transactions having reached the memory circuit, this recording mechanism being accessible by the main processor via the interface itself.

According to another embodiment, the software controlling the interface uses the recording mechanism of the last transactions beforehand, to automatically determine the predetermined access sequences.

According to another embodiment, the interface includes at least one command register able to receive commands from the HCPU, in which these commands are classified between highly ordered commands and poorly ordered commands; the poorly ordered commands issued between two highly ordered commands forming a set of poorly ordered commands within which the poorly ordered commands can be executed out of order; the highly ordered orders being executed in order relative to the other highly ordered commands and with respect to the sets of poorly ordered commands.

According to another embodiment, the interface includes at least one command register capable of receiving commands from the HCPU, these commands all being highly ordered.

According to another embodiment, the commands are reordered thanks to the use of a number included in the commands themselves.

According to another embodiment, the commands are reordered thanks to the use of a number included in the command addresses.

According to another embodiment, the commands are reordered thanks to the use of numbers, part of a number being included in the command itself, the rest being included in the address of the command.

According to another embodiment, the auxiliary processor is not integrated in the memory circuit, but is embedded in a circuit connected to the memory circuit.

According to another embodiment, there is no integrated processor and the memory is non-volatile.

BRIEF DESCRIPTION OF THE DRAWINGS

These and other features and benefits will be detailed in the following non-exhaustive description of particular embodiments in relation to the attached figures, in which.

DETAILED DESCRIPTION

Figure 1:
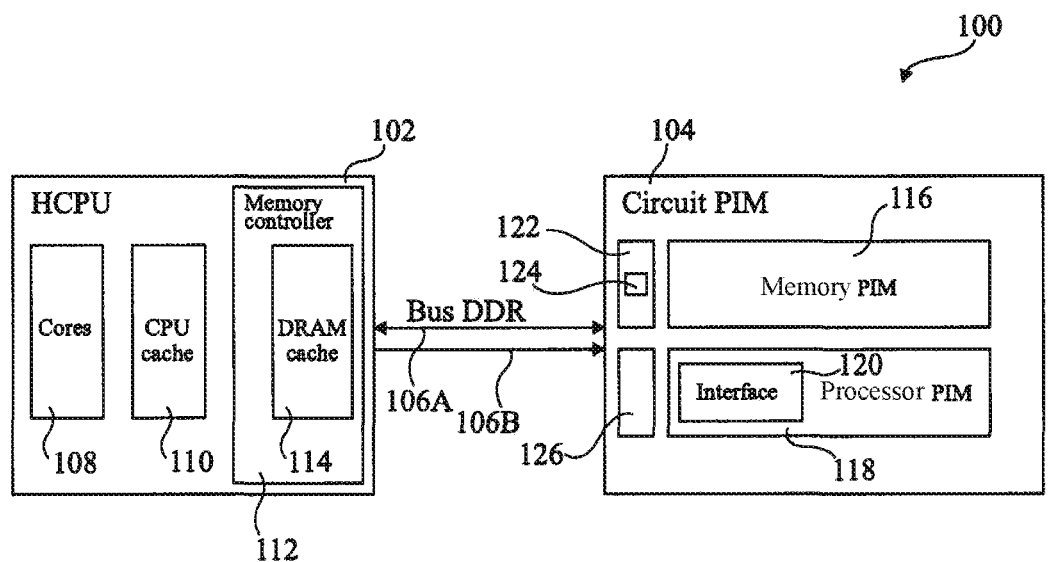
FIG. 1 schematically shows a calculation system according to an embodiment.

The DRAM Cache
Size of the DRAM Cache

The presence of a DRAM cache allows the following optimizations
  the rescheduling of the requests to memory circuits, including in particular the refreshment requests, in order to minimize the page openings, particularly slow operations,
  the anticipated reading of data that will probably be accessed in the near future.

The considerably large size of the CPU cache (up to several tens of Mb) means that it is unnecessary that the DRAM cache be of a significant size for the essential part of the performance gains it can bring to be achieved.

It is notable that the marketing documents of the HCPU manufacturers do always mention the size of the CPU cache but never the very existence of the DRAM cache: this is so because its size is insignificant compared to that of the CPU cache.

Applicability

The question arises whether to use the techniques described below to completely do without cache management instructions, because if these techniques work on the DRAM cache, one could imagine that they also work on the CPU cache.

But these techniques may not be effective when applied to large caches, so that the cache management instructions are quite adapted to the management of such caches.

Also there is no reason not to use the cache management instructions, the techniques described being used to complete and not to replace them.

Convention: Implicit Use of Cache Management Instructions

In this document, and in order to simplify the explanations, the cache management instructions are implicitly used in the following cases:
when it is said that the HCPU writes data, it must be understood that the HCPU actually performs the two following actions:
  it writes this data using a normal writing instruction in memory,
    it uses a cache management instruction updating the corresponding entry of the CPU cache but not affecting the DRAM cache.
when it is said that the HCPU reads a data, it should be understood that the HCPU actually carries out the two following actions:
  it uses a cache management instruction disabling the corresponding entry of the CPU cache but not affecting it DRAM cache,
  it reads this data using a normal reading instruction in memory.

Implicit Use of Memory Barrier Instructions

The HCPU is usually a high-performance processor thus capable of executing instructions out of order (Out Of Order processor: 000 processor), in addition to cache management instructions, the use of "memory barrier" instructions is possible to force the execution of instructions in an appropriate order.

A MB (memory barrier) instruction ensures that all accesses generated by instructions before the BM instructions are fully executed from the CPU cache point of view, before an access generated by an instruction after the BM instruction is performed.

The instruction set of an HCPU may include, for optimal performance, variations around this concept, with, for example, barrier instructions for writing only or reading only.

All this is well known to the person skilled person in the art, who will choose, where applicable, the most appropriate barrier instruction.

Solution for Interface Registers

The techniques described below for resolving the above problems include:
  the resolution of problems related to interface registers,
  the resolution problems related to the PIM memory.

The difference arising from the fact that the interface registers are much fewer in number that the memory words of the PIM memory.

The expression "mapped" register means that the register is accessible at a physical address. A register can be mapped several times: it means that it is accessible at several different physical addresses.

Reduction in the Number of Interface Registers

FIG. 1 illustrates a calculation system including a processing device 102 coupled by a bus, for example of the DDR type (from the English "Double Data Rate"), to a memory circuit 104. The bus includes for example a data bus 106A and an address bus 106B.

Device 102 includes, for example, one or more processing cores 108, a CPU (Central Processing Unit) cache 110, and a memory controller 112 including a cache 114. Cache memory 114 is, for example, a DRAM cache (Dynamic Random Access Memory) in the case where the memory circuit 104 is a DRAM type memory.

The memory circuit 104 includes, for example, a memory 116, a processing device 118 and an interface 120. In addition, the circuit 104 includes, for example, an address translation circuit 122 comprising one or more registers 124 and a monitoring circuit 126.

The solution provides that each interface register is mapped a certain number of times, the number depending on the characteristics of the DRAM cache.

For a physical address range of a given size, the fewer the interface registers are, the more each of them can be mapped numerous times. It is still possible to implement an interface having very few interface registers, thus being able to have each of its registers mapped a large number of times, using an indirect access system.

For example, the interface of the PIM processor 118 can include only 3 directly accessible registers, allowing an indirect access to a much larger number of registers:
an index_register, accessible only in writing,
a write_register, accessible only in writing,
a read_register, accessible only in reading.

Such an interface provides indirect access to a large number of registers:
To read a register that is accessible only indirectly:
the index of this register must be written in the index register
the read_register must be read.
To write a registry that is only accessible indirectly:
the index of this register must be written in the index register,
the data to be written must be written in the write register.

Figure 2:
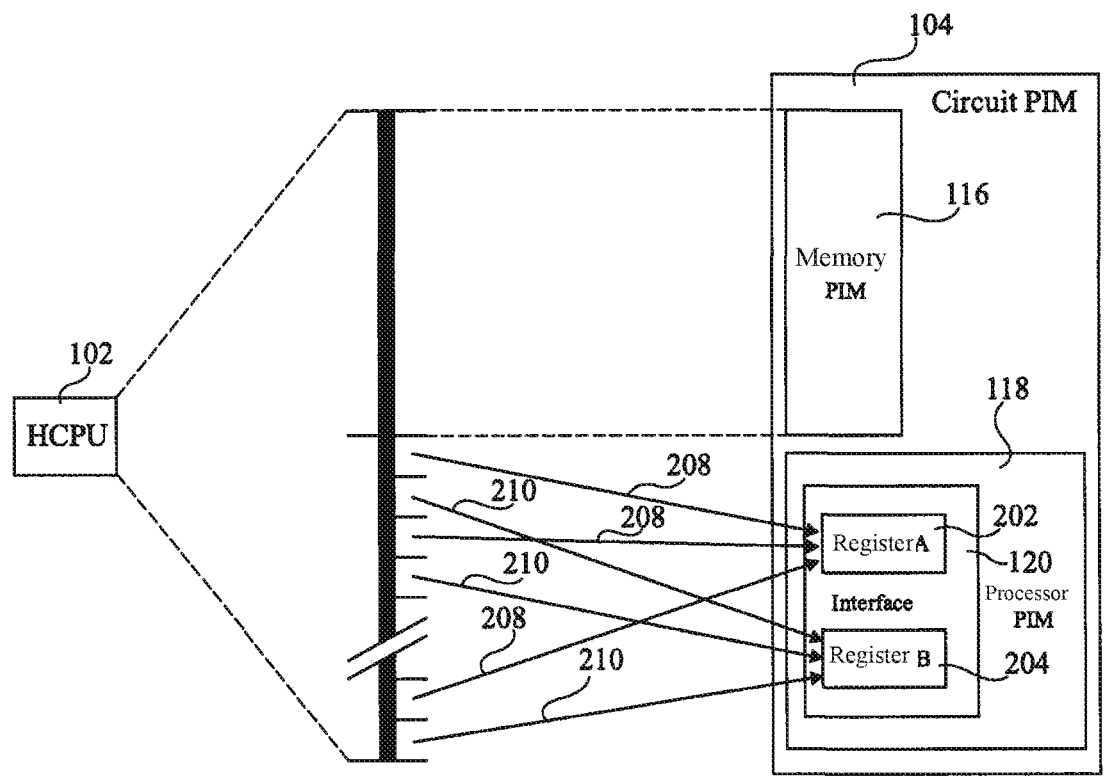
FIG. 2 illustrates in more detail a memory interface of the system in FIG. 1 according to an embodiment.

In this document, only the set of interface registers of a PIM processor that are directly accessible by the HCPU is referred to as the interface of this PIM processor; from the point of view of the invention, the indirectly accessible registers are not part of the interface of the PIM processor.
Creation of a Large Number of Addresses for Each Interface Register As shown in FIG. 2, the memory circuit 104 contains $2^N$ memory words, but to create many address, this one is stated as having $2^{(N+i)}$ memory words, with i>0.

A physical address range, the size of which is $2^N$, being devoted to map the memory words, there remains a physical address range the size of which is $((2^i)-1)\times(2^N)$ available for mapping the registers 202, 204 of the interface 120 of the PIM processor, allowing to map each of these registers a large number of times.

The boot code (BIOS/boot firmware) and the operating system (OS) must take into account the actual size of the memory and not the stated size.
The memory tests performed during system start-up must only concern the physical address range corresponding to the actual memory,
the OS must initialize the databases of its memory allocators, taking into account of the actual size of the memory.
Mechanism of the Invention for the Interface Registers For interface registers, the interface software uses, for each access to a register (e.g. accesses 208 to register 202 and accesses 210 to register 204 in FIG. 2), a different address mapping it; consequently:
the DRAM cache will not provide data that it already has in one of its entries, as the address will not match it, solving the problem of cache invalidation instructions that do not affect the DRAM cache,
the DRAM cache will not merge writing transactions: such mergers require that the transactions have the same address,
the DRAM cache will "overflow" quickly, naturally pushing the writing transactions stored there a to be executed.

Concerning the last point, the interface software:
can ensure at any time that a writing has actually been performed, by rereading the addressed interface register (using of course another address mapping this register),
can, after a series of entries, generate "fake" accesses, in reading or in writing, whose sole purpose is to push the previous writings out of the DRAM cache, this causing their execution (and it can verify that these entries have actually been made, and generate new fake accesses if this is not the case).

Of course, an interface register can not be mapped an infinite number of times, so, past a certain number of accesses to this register, the set of addresses mapping it will be exhausted and addresses already used are going to be used again.

For this reason, the set of available addresses for each interface register must be large enough, in order to that before an address is reused, there is no chance of an entry into it DRAM cache still being associated with this address.

The minimum size of all addresses mapping an interface register is of course a function of the size and characteristics of the DRAM cache.
Simple Generation of the Address List The series of addresses mapping the control register is generated by a circular function F:
when an address A1 is used, the following address A2 is given by F(A1)
the state associated with a memory word, called the current address, is summarized by the address used for its last access (see a field of this address if part of the address remains fixed).
Common Address Series Several interface registers, instead of being each associate with a private current address, can use a common current address, this being governed at each access in the following way:
the address for access to a register is the result of the sum of an offset, depending on the considered register, and of the common current address,
following access, the common current address is being updated by the function F.
Rescheduling of Command Writings An interface register able to receive commands is called in this document control register, the commands that may arrive at such a register being divided into two classes:
a weakly ordered class: including, for example, data writing commands, instructions and parameters,
a highly ordered class including, for example, commands starting up the PIM processor,
stopping the PIM processor,
obtaining the PIM processor status.

The belonging of a command to one or the other class is encoded in the command itself. The ordering rules are as follows:
weakly ordered commands are not ordered one with respect to another:
a weakly ordered command issued before another weakly ordered command can be executed after it,
weakly ordered commands are ordered with respect to the highly ordered commands:
a weakly ordered command issued before a strongly ordered command cannot be executed after the latter, a weakly ordered command issued after a highly orderly command cannot be executed before the latter, highly ordered commands are ordered with respect to one another, a highly ordered command issued before another highly ordered command cannot be executed after the latter.

Rescheduling of Highly Ordered Commands

Because of the DRAM cache, the strongly ordered commands can be received in disorder by the receiving command registry, but, however, they must be executed in the order of their generation: For this purpose, strongly ordered commands are numbered during their generation.

Numbering in the Command

In this method, each strongly ordered command destined to a given command register, includes a n-bit field used to number it.

In addition, the following hardware resources are associated with the command register:

a counter of n-bits, called current command number, containing the current number of the highly ordered command to be executed;

a memory of $2^n$ inputs, called a control buffer, each input being:
  either in a valid or invalid state,
  initially in the invalid state,
  in the valid state, able to store a highly ordered command.

These hardware resources follow the following algorithm: when a highly ordered command is written in the command register, its V number is compared with the current command number;
  if the numbers correspond, the command is executed,
  otherwise, the command is recorded in the buffer command entry [V] and this entry is noted as valid. when a command is complete, the current command number is incremented, its new value being noted W, and:
  if the entry to the command buffer [W] is valid, then the command it contains is executed and the entry is marked as invalid.

The interface software can read the current command number in order to acknowledge the last executed command, which allows to know how many commands have been executed, and thus how many new strongly ordered commands it can generate without exceeding the capacity of the command buffer. Thus, it can generate highly ordered commands as the previous ones are executed.

Establish a distinction between highly ordered commands and weakly ordered commands allows the following:
  limiting the size of the command buffer,
  executing weakly ordered commands in their order of arrival rather than in their order of emission, thus improving the performance,
  Executing weakly ordered commands in parallel if the interface has the internal parallelism to support it.

Numbering in the Address

In this method, which is a variation of the previous method, part of the address where the command is written is used as the command number.

The series of addresses mapping the command register is generated by a circular function F:
  when an A1 address is used, the address according to A2 is given by F(A1).

The function F:
  only modifies a n-bit field of the address, marked CA,
  defines a set of E of M possible values of CA.

The command register is associated with the following hardware resources:

a counter of n-bits, called the current command number, containing the current number of the highly ordered command to be executed, a memory of M entries called a command buffer, each entry being:
  only indexed by one of the values of set E,
  able to be either in a valid or invalid state,
  initially in the invalid state,
  able, in the valid state, to store a highly ordered command.

These hardware resources observe the following algorithm, when a highly ordered command arrives at the command register, its CA field is compared to the value of the current command number:
  if CA and the current command number correspond, the command is executed,
  otherwise, the command is recorded in the entry of the command buffer which has the CA index and this entry is noted as valid.

when a highly ordered command is completed, the current command number is changed by the F function and:
  if the entry of the command buffer designated by the new current command number is valid, then the command it contains is executed and the entry is flagged as invalid.

Mixed Numbering

This method actually uses both previous methods, the command number being partly made up of an address field and in part of a command field.

Rescheduling of Weakly Ordered Commands

The weakly ordered commands don't need to be rescheduled, it must just be ensured:

1. that there is no highly ordered commands waiting to be executed before generating weakly ordered commands, 2. that there are no weakly ordered commands waiting to be executed before generating highly ordered commands.

The first point is easy to determine since the interface software:
  knows how many highly ordered commands it has issued,
  can know, by reading the current command number, how many highly ordered commands have been executed.

The second point is easy to determine by associating to each command register, a register counting how many weakly ordered commands received by the command register have been executed.

Note: a FIFO may be used to store the weakly ordered command, in the case where the rate of their arrival may be superior to the rate of their execution.

Avoidance of Early Readings

It is desirable to avoid that the DRAM cache performs early readings. This type of reading can be triggered automatically when the DRAM cache follows a regular access pattern, such as a series of accesses in which each access takes place at a fixed "address distance" (strict address) from the previous access. The DRAM cache can have a logic capable of detecting such an access pattern and deciding to read data in advance based on this access pattern.

Note: in a CPU cache with a delayed writing allocation policy ("write back"), the most common allocation policy, as it is the most efficient on average, for writing in the memory, results initially in a reading.

To avoid early readings, it is desirable that the set of available addresses for the same interface register be scanned in such a way that for three successive accesses, N, N+1 and N+2, to this register:

$$(address(N+2)-address(N+1))<>(address(N+1)-address(N))$$

Concerning this logic of early reading of the DRAM cache, it is likely that this takes into account the fact that the addresses of a series of accesses remain or not on the same DRAM page, and the address series used to access an interface register must take this fact into account.

The person skilled in the art will easily understand when, depending on the function of the early reading strategy of the DRAM cache, the order of address use can be more or less complicated, but that it is possible to generate a order such as the early loading strategy is not activated, not recognizing any regular access pattern.

In any case, in order to protect from possible early readings, it is desirable that the interface of the PIM processor does not include registers that are modified by their reading.

Solution for PIM Memory

Problems of access to the interface register are fundamentally solved by the fact that each of these registers is mapped multiple times.

This is not possible with the PIM memory. For example, considering a memory containing $2^N$ memory words stated as a memory containing $2^{(N+2)}$ memory words: such a memory has 4 times more addresses than memory words.

By symmetry, it is reasonable to consider that it is not interesting, to solve the problem of access to the PIM memory, to have some memory words more mapped than others. It would therefore be logical to make the following distribution:
- ¼ of the physical addressing space of the memory circuit is dedicated to the interface of the PIM processor. The number of its registers is very low, so each of these registers will be mapped millions of times, allowing to easily solve the access problem for these interface registers.
- the ¾ of the physical addressing space is dedicated to mapping the PIM memory itself, actually allowing each memory word to be mapped only 3 times.

In conclusion, it is not possible to map each memory word enough times for the address change mechanism to be effective for each access.

Solution Using a Sliding Window

Instead of declaring the memory to be 4 times larger, it would be necessary to declare it even greater, which is generally not possible, because it corresponds to memory configurations not supported by the DRAM memory controller.

Figure 3:
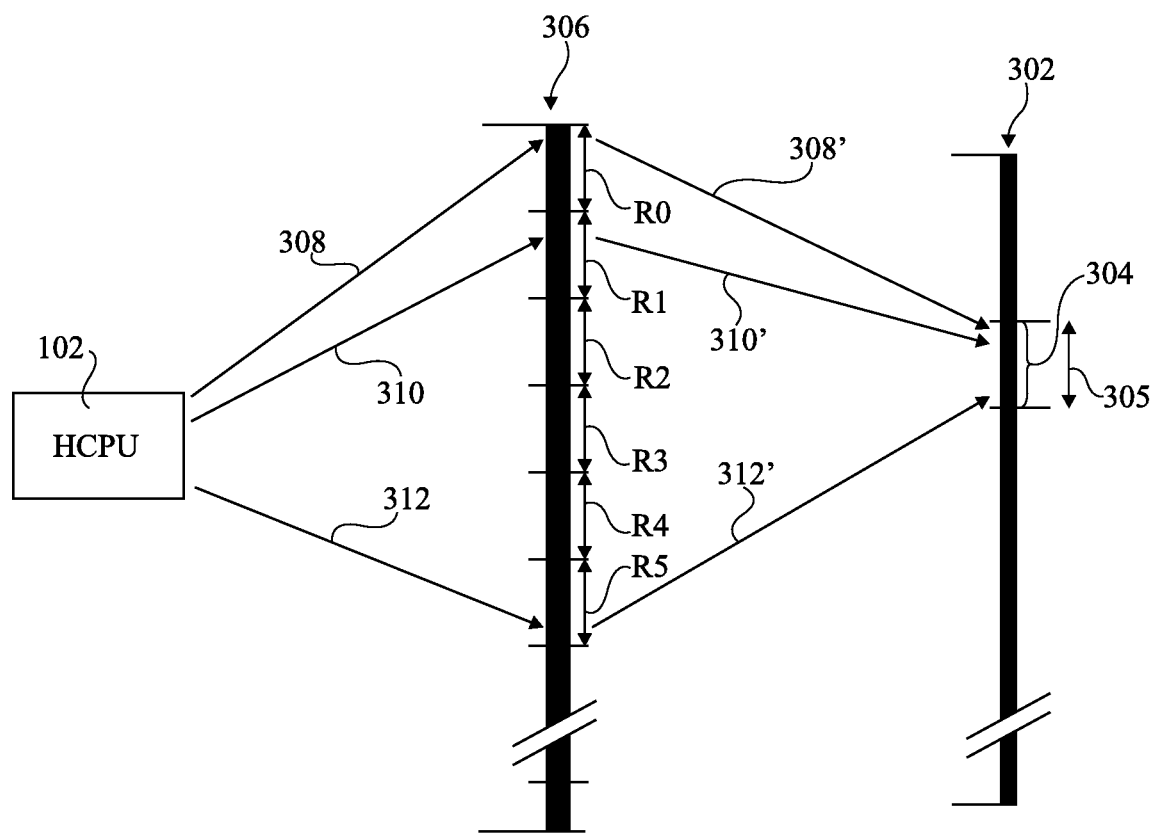
FIG. 3 illustrates a memory interface in more detail of the system of FIG. 1 according to another embodiment.

As illustrated in FIG. 3, a solution is to use an access window 305, called sliding window, of which the location 304 in the PIM memory 302 (and possibly the size) can be configured via interface registers, this sliding window being mapped many times in a large range of physical addresses 306 called multiple window.

Organization of Physical Addresses

For example, and considering a PIM memory whose declared size is 4 times larger than the actual size as in the previous example, the physical addresses of the PIM circuit could be organized as follows:
- the first $2^N$ physical addresses conventionally map the actual memory,
- the next $2^N$ physical addresses map the interface many times,
- the $2^N(N+1)$ physical addresses constitute the multiple window, where the sliding window is mapped many times.

Note: the physical address space conventionally mapping the PIM memory can be used by the HCPU to access the areas of the PIM memory that are not accessed by the PIM processor.

Note: depending on the embodiment of the invention, the PIM memory area on which the sliding window is positioned may or may not remain accessible through the conventional physical address space of the PIM memory.

An access in the sliding window (for example, accesses 308, 310 and 312 in FIG. 3) will then be processed in a access in the PIM memory area on which this sliding window is commonly positioned (for example, accesses 308', 310' and 312' in FIG. 3).

The sliding window is accessible via a plurality of physical address ranges, all these physical address ranges constituting the multiple window.

The sliding window is such that it is entirely included on a page from the DRAM, the position of the sliding window being possibly expressed as a couple $\{x, y\}$:
- x being a page number,
- Y being a bite offset on the page, where the size of the sliding window and the possible values of y are such that the sliding window can never overlap two pages of the PIM memory.

When the interface software wants to access
- PIM memory areas
- it configures one or more interface registers to make the sliding window coincide with the considered memory area,
- it uses accesses with changing addresses to execute the desired accesses,
- it can then move to the next area, provided that all accesses made through the sliding window have been made:
- the writings are effective,
- the readings are effective.

Note: regarding the last two sub-items, if the HCPU is a OOO processor, the use of memory barrier instructions may be necessary.

When the interface software has written all the areas concerned, it uses fake accesses, to push out of the DRAM cache the last writings on standby that might be found there.

In general, the interface software can now use, to access the PIM memory currently targeted by the sliding window, all the above-described solutions to access the interface register, including the use of a common current address.

Moving of the sliding window:
- moving the sliding window does not modify the current or common addresses; the interface software modifies a private current or common address only when this is used for an access: it is not modified by moving the sliding window.
- All the accesses having used a positioning of the sliding window, must be effective (must have reached the memory circuit), before the window is moved to another position.

Considerations on the Time of Crossing the Logic Embodying the Invention:

The implementation of some interface registers, mapped many times, is not significantly difficult regarding the speed of the logic, especially since the number of such registers is very small.

On the other hand, the speed of the logic implementing the sliding window mechanism can be more problematic, as explained below.

As previously indicated, the position of the sliding window can be expressed by a couple $\{x, y\}$:

x being a page number, y being a bite offset on the page.

The sliding window is thus associated to page x of the PIM memory, this association being programmable via interface registers.

When the DRAM memory controller emits a page activation transaction targeting any page p of the multiple window, then the number of page p must be replaced by page number x.

Decoding this case is simple because it suffices to look at very few bits of a page number to determine that this page belongs to the multiple window.

Nevertheless, this simple decoding, and the replacement of the value p by the value x, slightly increases the crossing time of the logic path constituted by the activation logic of the memory circuit.

To implement the logic window mechanism, it may be planned to extend slightly the latency time of an activation operation, the value of this being programmable in the memory controller.

Method of Access Barriers

In this method, predetermined access sequences are used to fill the DRAM cache with transactions of no importance:
  chasing pending writings, thus performing their update,
    chasing read data, thus invalidating them.

Knowing the characteristics of the DRAM cache, it is possible to create the following access sequences:

DCW_BARRIER (Dram Cache Write Barrier), writing barrier for DRAM caches: it ensures that all writings made before the start of DCW_BARRIER are effective (visible by the PIM processor) at the end of DCW_BARRIER.

DCR_BARRIER (Dram Cache Read Barrier), a reading barrier for DRAM caches that ensures that all data read after the end of DCR_BARRIER is more recent than the date on which DCR_BARRIER was started.

DCM_BARRIER (Dram Cache Memory Barrier): a read and write barrier for DRAM caches, equivalent to either:

a DCW_BARRIER followed by a DCR_BARRIER, or a DCR BARRIER followed by a DCW_BARRIER.

As DCW_BARRIER and DCR_BARRIER both work by chasing the previous data from the DRAM cache, and, unless the DRAM cache is asymmetrical in its management of the readings and writing, will usually result in:
DCW_BARRIER=DCR_BARRIER=DCM_BARRIER Some DRAM cache architectures may allow the reduction of DCW_BARRIER, DCR_BARRIER and DCM_BARRIER sequences, and thus the reduction of their execution time, if the effect of these barriers only applies to a address range with specified parameters.

For example, if the address range is specified by its start address and its end address, then the following BARRIER access sequence variants may be used:

DCW_BARRIER(start_addr, end_addr) ensures that all writings performed before the start of DCW_BARRIER(start-addr, end_addr) in the address range {start_addr, end_addr} are effective at the end of DCW_BARRIER(start_addr, end_addr).

DCR_BARRIER(start_addr, end_addr) ensures that all values read in the address range {start_addr, end addr} after the end of DCR_BARRIER(start_addr, end addr) are more recent than the date on which DCR_BARRIER(start_addr, end_addr) was started.

DCM_BARRIER(start_addr, end_addr) equals to:
either DCW_BARRIER(start_addr, end_addr) followed by DCR-BARRIER(start_addr, end_addr)
or DCR_BARRIER(start_addr, end_addr) followed by DCR-BARRIER(start_addr, end_addr).

Application to Non-Volatile Memories

A non-volatile memory, without a PIM processor, may nevertheless have an interface allowing it to use all aspects of the invention, notably those allowing:
  to push the pending entries out of the DRAM cache,
  to check that the writings are effective in the PIM memory.

Determining the Characteristics of the DRAM Cache

The address sequences to be used in the invention depend on the characteristics of the DRAM cache.

Obtaining the Documentation

It is much easier to obtain documentation about the DRAM cache from the HCPU manufacturer, than to ask the manufacturer to modify its HCPU.

Analysing the Behaviour of the DRAM Cache

If information on the DRAM caches present in the HCPU is not available, it is possible to analyze the traffic generated by the DRAM memory controller of an HCPU processor. This type of analysis is commonly performed notably by manufacturers of DRAMs and DIMM memory cards, in particular to develop their products and check their conformity, but also by computer manufacturers using HCPU processors, for the development of their systems.

Some analysis systems, such as those from Tektronix, can analyze the traffic of the DRAM controller of a HCPU processor.

By running a program designed for this purpose on the HCPU, and using a traffic analysis tool such as those from Tektronix, it is possible to determine, among others, the following DRAM cache parameters:
  the maximum size of a DRAM cache entry,
  the associativity of the DRAM cache,
  the number of entries in the DRAM cache,
  the replacement policy.

Analysis of the DRAM Cache Via the Interface

The interface may include physical means to record the N last transactions received, or at least a sufficient part of their characteristics, this recording being accessible via the interface itself.

The presence of these recording means allows the people in charge of developing the interface software, to avoid the use of external means of analysis, which are quite expensive.

It is even possible to design an interface software capable, in many cases, to determine automatically, without external analysis means, the characteristics of the DRAM cache, and thus to automate the creation of the DCR_BARRIER, DCW_ BARRIER and DCM_BARRIER access sequences.

Consideration of DRAM Circuit Benches

A DRAM memory is organized in benches, pages and columns.

For the sake of simplicity, the description of the invention has not taken into account the presence of benches, a DRAM being organized in a benches, pages and memory words. Basically, the presence of benches in a DRAM allows to have several pages open (one page opened per bench at most).

As will be easily understood by the person skilled in the art, the invention described herein is not modified by the presence of benches.

The invention claimed is:

1. A calculation system comprising
  a computing device having one or more instruction-controlled processing cores and a memory controller, the memory controller including a cache memory; and
  a memory circuit coupled to the memory controller via a data bus and an address bus, the memory circuit being adapted to have a first m-bit memory location accessible by a plurality of first addresses provided on the address bus, the computing device being configured to select, in order to each memory operation accessing the first m-bit memory location, one address among the plurality first addresses, wherein each address of the plurality of first addresses includes a first n-bit value and a second p-bit value, the computing device being configured to perform a writing operation of writing data to the m bits of the first memory location by performing a reading operation of the first memory location using one of the first addresses having a first selected n-bit value and a second p-bit value generated according to the writing data.

2. The calculation system according to claim 1, wherein the first m-bit memory location is accessible by a plurality P of first addresses, the computing device being configured to use a first of the addresses to access the first memory location during a $N^{th}$ and a $(N+P)^{th}$ access operation to the first memory location.

3. The calculation system according to claim 1, wherein the memory circuit is adapted, in response to receiving a reading operation directed to the first memory location using one of the first addresses, to write the second p-bit value of the address in the first memory location.

4. The calculation system according claim 1, wherein p and m are positive integers and m is equal to or greater than p.

5. The calculation system according to claim 1, wherein the memory circuit is adapted to have a second memory location accessible by a plurality of second addresses provided on the address bus.

6. The calculation system according to claim 5, wherein the first and second memory locations are part of a first memory location range of the memory circuit, the first memory location range being selected by a sliding address window, in which the memory locations of the first memory location range are addressable:
 by the corresponding addresses in a first range of addresses comprising one of the first plurality of addresses and one of the second plurality of addresses; and
 by the corresponding addresses in a second range of addresses comprising another one of the first plurality of addresses and another one of the second plurality of addresses;
 the memory circuit comprising an address conversion circuit adapted to convert addresses in the first and second address ranges to corresponding addresses in the sliding address window.

7. The calculation system according to claim 6, wherein the address conversion circuit includes at least one register which is programmable in order to define the location of the sliding address window.

8. The calculation system according to claim 7, wherein said at least one register of the address conversion circuit is programmable to define the location and the size of the sliding address window.

9. The calculation system according to claim 1, wherein the memory controller is adapted to perform a cache clearing operation, the cache clearing operation comprising one or more sequences of memory access instructions performed by the memory controller resulting in:
 all or part of the cache memory writing transactions stored in the cache memory of the memory controller is written to the memory circuit; or
 all or part of the reading data stored in the cache memory of the memory controller is cleared from the cache memory, the reading data including data read from the memory circuit before the cache clearing operation; or
 all or part of cache memory writing transactions stored in the cache memory of the memory controller is written to the memory circuit and all or part of the reading data stored in the cache memory of the memory controller is cleared from the cache memory.

10. The calculation system according to claim 9, wherein the memory circuit further includes an auxiliary processor, and wherein the memory access instruction sequence includes only register access instructions for accessing one or several command registers of the memory circuit in order to control the auxiliary processor.

11. The calculation system according to claim 9, wherein the memory circuit includes a monitoring circuit, accessible by the computing device, and adapted to record memory access transactions performed in the memory circuit, the computing device being configured to generate said one or several memory access instruction sequences based on the transactions recorded by the monitoring circuit.

12. The calculation system according to claim 5, wherein the memory circuit further comprises an auxiliary processor, the first and second memory locations being control registers of the auxiliary processor.

13. The calculation system according to claim 12, wherein the computing device is configured to generate first and second type commands, the memory circuit being adapted to modify the order of commands received from the computing device such that, for a first group of commands of the second type generated by the computing device between first and second commands of the first type, the order of the first and second commands of the first type in relation to the group of commands of the second type is respected.

14. The calculation system according to claim 13, wherein the memory circuit is adapted to modify the order of the commands based on an order value associated with at least each order of the first type, the order value orderly of each command being included:
 in the address of the recipient of the commands; or
 in the command itself; or
 partially in the address of the recipient of e command and partially in the command itself.

15. The calculation system according to claim 1, wherein the computing device comprises a CPU cache memory configurable by cache management instructions, the cache memory of the controller memory not being configurable by cache management instructions.

16. The calculation system according to claim 1, wherein the memory circuit includes a non-volatile memory matrix.

17. A method for accessing a memory circuit coupled to the memory controller of a computing device via a data bus and an address bus, the computing device having one or several core processors and the memory controller comprising a cache memory, the process including:
 selecting, by the computing device, for each memory operation accessing a first m-bit memory location of the memory circuit, an address among a plurality of first addresses, the first m-bit memory location being accessible by each of the plurality of first addresses provided on the address bus, wherein each address of the plurality of first addresses includes a first n-bit value and a second p-bit value, the computing device being configured to perform a writing operation of writing data to the m bits of the first memory location by performing a reading operation of the first memory location using one of the first addresses having a first selected n-bit value and a second p-bit value generated according to the writing data.

\* \* \* \* \*